United States Patent
Hayashida et al.

(10) Patent No.: US 6,200,705 B1
(45) Date of Patent: Mar. 13, 2001

(54) NICKEL-HYDROGEN SECONDARY BATTERY

(75) Inventors: Hirotaka Hayashida; Hiroshi Kitayama, both of Fujisawa; Masaaki Yamamoto, Inzai; Shusuke Inada; Isao Sakai, both of Yokohama; Tatsuoki Kono, Kawasaki; Hideki Yoshida, Yokohama; Takamichi Inaba, Yokohama; Motoya Kanda, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/200,890

(22) Filed: Nov. 27, 1998

(30) Foreign Application Priority Data

Nov. 28, 1997 (JP) .................................................. 9-329211

(51) Int. Cl.⁷ .............................. H01M 4/66; H01M 4/48
(52) U.S. Cl. .................. 429/218.2; 429/223; 429/231.6; 429/231.5; 429/253; 429/254
(58) Field of Search .................................. 429/218.2, 223, 429/231.6, 231.5, 253, 254

(56) References Cited

U.S. PATENT DOCUMENTS

| | | | |
|---|---|---|---|
| 4,946,646 | * | 8/1990 | Gamo et al. . |
| 5,554,456 | * | 9/1996 | Ovshinsky et al. . |
| 5,766,799 | * | 6/1998 | Hong . |
| 5,798,189 | | 8/1998 | Hayashida et al. . |
| 5,807,643 | | 9/1998 | Yamamoto et al. . |
| 5,840,166 | * | 11/1998 | Kaneko . |
| 5,962,165 | * | 10/1999 | Tsuruta et al. . |
| 6,130,006 | * | 10/2000 | Kohno et al. . |

FOREIGN PATENT DOCUMENTS

97/03213  1/1997  (JP) .

* cited by examiner

Primary Examiner—Patrick Ryan
Assistant Examiner—Jonathan Johnson
(74) Attorney, Agent, or Firm—Oblon, Spivak, McClelland, Maier & Neustadt, P.C.

(57) ABSTRACT

A nickel-hydrogen secondary battery having a negative electrode comprising a hydrogen-absorbing alloy containing magnesium, a rare earth element and nickel as essential elements, which is capable of suppressing the self-discharge being occurred under the condition of high temperature storage, or the like. This secondary battery comprises a negative electrode containing a hydrogen-absorbing alloy, a positive electrode containing nickel hydroxide, a separator comprising a non-woven fabric, and an alkaline electrolyte. The hydrogen-absorbing alloy is represented by $(R_{1-x}Mg_x)Ni_yA_z$ (wherein R is at least one element selected from rare earth elements (including yttrium), Ca, Zr and Ti, A is at least one element selected from Co, Mn, Fe, V, Cr, Nb, Al, Ga, Zn, Sn, Cu, Si, P and B), and x, y and z are atomic ratio individually defined as $0<x<1$, $0 \leq z \leq 1.5$, $2.5 \leq y+z < 4.5$). The ratio between the weight of the hydrogen-absorbing alloy per unit area of the negative electrode (M1 (mg/cm²)) and the weight per unit area of the separator (M2 (g/m²)) meets the condition of $M1/M2 \leq 6$.

11 Claims, 2 Drawing Sheets

NICKEL-HYDROGEN SECONDARY BATTERY

BACKGROUND OF THE INVENTION

This invention relates to a nickel-hydrogen secondary battery.

As a nickel-hydrogen secondary battery where a hydrogen-absorbing alloy is employed as a negative electrode, those provided with a negative electrode constituted by an $LaNi_5$-based alloy having $CaCu_5$ type crystal structure as a main phase, or by an alloy having, as main phase, a Laves phase containing constituent elements such as Ti, Zr, V and Ni have been conventionally put into practical use.

In particular, most of secondary batteries produced at present are occupied by a nickel-hydrogen secondary battery employing an $LaNi_5$-based hydrogen-absorbing alloy, and this nickel-hydrogen secondary battery has been extensively employed. However, since the hydrogen absorption capacity of the $LaNi_5$-based alloy is basically in the ratio of 1:1 (hydrogen atom: metal atom), it is very difficult with this $LaNi_5$-based alloy to enhance the hydrogen absorption over the aforementioned ratio. When this hydrogen absorption capacity of the $LaNi_5$-based alloy is converted into an electrochemical capacity, it corresponds to about 370 mAh/g. However, since the $LaNi_5$-based alloy which is currently employed in the nickel-hydrogen secondary battery already indicates a hydrogen absorption capacity of as high as about 330 mAh/g, a more prominent increase in capacity density can be hardly expected as far as this $LaNi_5$-based alloy is concerned.

On the other hand, the hydrogen-absorbing alloy containing the Laves phase as a main phase is known as being capable of absorbing hydrogen in the ratio of 1:1 or more (hydrogen atom:metal atom). Therefore, it is theoretically possible with this Laves phase type hydrogen-absorbing alloy to enhance the capacity density of hydrogen absorption. However, this Laves phase type alloy is accompanied with problems that a stable oxide film tends to be formed on the surface of the alloy thereby making it impossible to sufficiently utilize the alloy, that it takes a relatively long time for initially activating the alloy, that it is difficult to obtain a sufficient charge/discharge efficiency, and that it is difficult to achieve a high capacity in concurrent with other desired battery properties, thus making it difficult to utilize the Laves phase type alloy as a material for the negative electrode.

Meanwhile, a newly developed hydrogen-absorbing alloy comprising, as main constituent elements, magnesium, nickel and a rare earth element is featured in that the absorption capacity thereof both per volume and per weight is higher than that of the $LaNi_5$-based alloy, and also in that the activation velocity thereof is higher and the charge/discharge efficiency is more excellent as compared with the Laves phase type hydrogen-absorbing alloy. Therefore, it is possible with this hydrogen-absorbing alloy to realize a secondary battery exhibiting a higher capacity as compared with a secondary battery provided with a negative electrode comprising the $LaNi_5$-based alloy, and also exhibiting a more excellent charge/discharge efficiency as compared with a secondary battery provided with a negative electrode comprising the Laves phase type hydrogen-absorbing alloy.

However, if an alkaline solution about 6 to 8 in normality is employed as an electrolyte in an alkaline battery provided with a negative electrode comprising a hydrogen-absorbing alloy containing magnesium, nickel and a rare earth element as a main constituent element, the surface of the hydrogen-absorbing alloy constituting the negative electrode which is contacted with the electrolyte is caused to oxidize slightly. As a result, hydroxides or oxides of magnesium, a rare earth element, a transition metal such as nickel, cobalt and manganese that have been generated through the aforementioned oxidation are caused to diffuse into the voids of the separator while repeating the dissolution and precipitation thereof in the electrolyte due to the fluctuation in temperature resulting from the generation of Joule heat at the occasion of charging/discharging. Therefore, when the secondary battery is kept in an erosion-promoting environment such as a high temperature storage in particular, the self-discharge of battery is accelerated due to a lowering in resistance of the separator, thus raising a problem.

Meantime, International Re-publication No. WO97/03213 discloses a hydrogen-absorbing electrode comprising a hydrogen-absorbing alloy having a specific antiphase boundary and a composition represented by the following general formula. This hydrogen-absorbing alloy is mentioned therein as having an $LaNi_5$ type crystal structure.

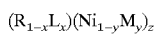
$$(R_{1-x}L_x)(Ni_{1-y}M_y)_z$$

wherein R is La, Ce, Pr or Nd; L is Gd, Tb, Dy, Ho, Er, Tm, Yb, Lu, Y, Sc, Mg or Ca; M is Co, Al, Mn, Fe, Cu, Zr, Ti, Mo, Si, V, Cr, Nb, Hf, Ta, W, B or C; and x, y and z are atomic ratio individually defined as $0.05 \leq x \leq 0.4$, $0 \leq y \leq 0.5$, and $3.0 \leq z \leq 4.5$.

BRIEF SUMMARY OF THE INVENTION

Accordingly, an object of the present invention is to provide a nickel-hydrogen secondary battery which is provided with a negative electrode comprising a hydrogen-absorbing alloy containing magnesium, a rare earth element and nickel as essential elements, and is capable of suppressing the self-discharge being occurred under the condition of high temperature storage, or the like.

Namely, according to the present invention, there is provided a nickel-hydrogen secondary battery comprising;

a negative electrode containing a hydrogen-absorbing alloy;

a positive electrode containing nickel hydroxide;

a separator comprising a non-woven fabric containing synthetic resin fibers; and an alkaline electrolyte;

wherein the hydrogen-absorbing alloy is represented by the following general formula:

$$(R_{1-x}Mg_x)Ni_yA_z$$

wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B); and x, y and z are atomic ratio individually defined as $0<x<1$, $0 \leq z \leq 1.5$, $2.5 \leq y+z<4.5$; and the secondary battery meets the condition represented by the following formula:

$$M1/M2 \leq 6$$

wherein M1 is a weight of the hydrogen-absorbing alloy per unit area of the negative electrode (mg/cm$^2$); and M2 is a weight per unit area of the separator (g/m$^2$).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
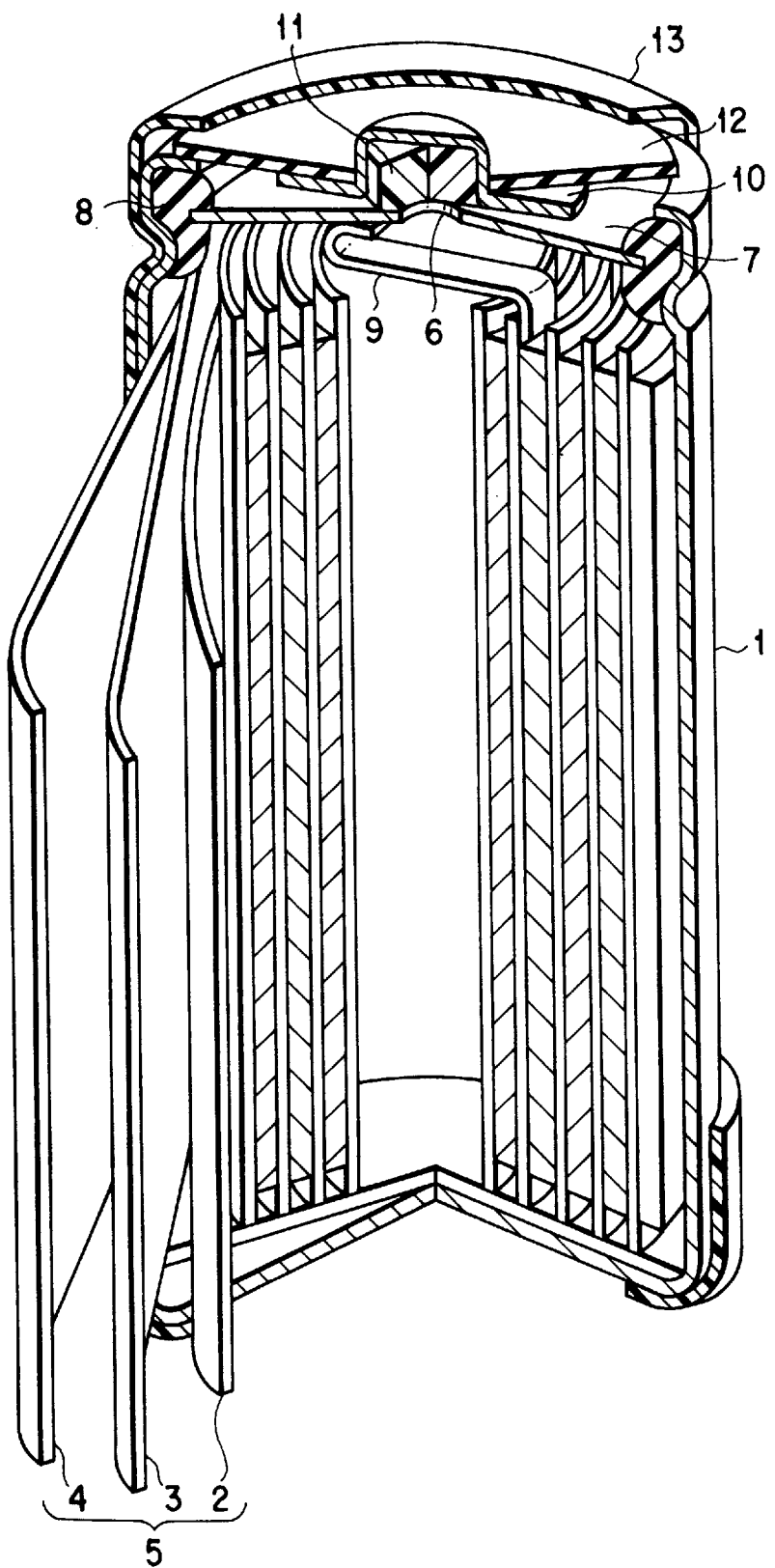
FIG. 1 is a partially sectioned perspective view showing a cylindrical nickel-hydrogen secondary battery representing one embodiment of an alkaline secondary battery of this invention.

This invention will be explained further with reference to FIG. 1 showing a cylindrical nickel-hydrogen secondary battery representing one embodiment of the nickel-hydrogen secondary battery of this invention.

Referring to FIG. 1, a bottomed cylindrical case 1 is accommodated therein with an electrode group 5 which has been manufactured by stacking a positive electrode 2, a separator 3 and a negative electrode 4 one another, and then by spirally winding the stacked body. The negative electrode 4 is disposed at the outermost periphery of the electrode group 5 so as to electrically contact with the cylindrical case 1. The cylindrical case 1 is also filled with an alkaline electrolyte. A sealing plate 7 formed of a disk having an opening 6 at the center is disposed on the upper opening of the cylindrical case 1. An insulating gasket 8 having a ring-like shape is interposed between the periphery of the sealing plate 7 and the upper inner wall surface of the opening of the cylindrical case 1. The peripheral fringe portion of the opening of the cylindrical case 1 is caulked inward so that the sealing plate 7 is hermetically fixed via the gasket 8 to cylindrical case 1. The positive electrode lead 9 is connected through its one end to the positive electrode 2 and through its other end to the lower surface of the sealing plate 7. A positive electrode terminal 10 having a hat-like shape is mounted over the sealing plate 7 in such a manner as to cover the opening 6. A rubber safety valve 11 is disposed in a space surrounded by the sealing plate 7 and the positive electrode terminal 10 in such a manner as to seal the opening 6. A holding plate 12 formed of an insulating disk having an opening at the center is disposed over the positive electrode terminal 10 in such a manner that the projected portion of the positive electrode terminal 10 is protruded out through the opening of the holding plate 12. An envelope tube 13 is disposed to cover all of the periphery of the holding plate 12, the side wall of the cylindrical case 1 and the periphery of the bottom of the cylindrical case 1.

Next, the details of the positive electrode 2, the negative electrode 4, the separator 3 and the electrolyte will be explained.

(1) The Positive Electrode 2

This positive electrode 2 contains nickel hydroxide powder acting as an active material. This positive electrode 2 may be a sintered type nickel positive electrode which is well known, or a non-sintered type nickel positive electrode (a paste type nickel positive electrode) which can be manufactured by a process wherein a conductive material is added at first to nickel hydroxide powder (an active material) to obtain a mixture, which is then kneaded together with a high molecular weight binder and water to prepare a paste, which is then stuffed into a conductive substrate and, after being dried, molded into a predetermined shape.

As for the conductive material to be mixed into the paste, cobalt oxide, cobalt hydroxide, cobalt metal, nickel metal or carbon can be employed.

Examples of the high molecular weight binder are carboxymethyl cellulose, methyl cellulose, sodium polyacrylate, and polytetrafluoroethylene.

The conductive substrate to be used for constituting the non-sintered type nickel positive electrode may be formed of a mesh-like, sponge-like, fibrous or metallic porous body which is made of a metal such as nickel, stainless steel or a nickel-plated metal.

(2) The Negative Electrode 4 This negative electrode comprises a hydrogen-absorbing alloy represented by the following general formula;

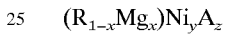

$(R_{1-x}Mg_x)Ni_yA_z$ wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B; and x, y and z are atomic ratio individually defined as $0<x<1$, $0 \leq z \leq 1.5$, $2.5 \leq y+z<4.5$;

As for the R to be incorporated into the hydrogen-absorbing alloy, it is preferable to employ a rare earth element (including yttrium). Further, if a rare earth element is to be employed as the R, it is more preferable in view of saving the manufacturing cost of a hydrogen-absorbing electrode to employ at least one kind of rare earth elements selected from the group consisting of La, Ce, Pr, Nd and Y. One example of such a preferable example of the R is a misch-metal which is a mixture of rare earth elements such as Ce-rich Mm and La-rich Lm.

It is also possible to employ, as the R, a mixture containing at least one element selected from Ca, Zr and Ti, in addition to the aforementioned rare earth elements. In this case, the former elements may be incorporated therein substituting for 30 atom. % or less of the rare earth elements.

When the range of the x in the general formula is confined to the aforementioned limitation, it is possible to overcome the problem of difficulty in releasing hydrogen and hence to realize a large discharge capacity. In particular, the range of the x should more preferably be confined to the range of $0.1 \leq x \leq 0.6$. Because if the x is less than 0.1, the problem of difficulty in releasing hydrogen from the hydrogen-absorbing alloy may not be sufficiently overcome, thus making it difficult to obtain a secondary battery of large discharge capacity. On the other hand, if the x exceeds over 0.6, the reversible absorption/desorption quantity of the alloy would be deteriorated, thus making it difficult to obtain a secondary battery of large discharge capacity. A most preferable range of the x is $0.15 \leq x \leq 0.45$.

When the range of the z in the general formula is confined to the aforementioned limitation, it is possible not only to enhance the hydrogen absorption/desorption property such as the hydrogen absorption/desorption rate of the alloy, but also to prominently improve the charge/discharge cycle property of the nickel-hydrogen secondary battery. However, if the z exceeds over 1.5, the discharge capacity of the secondary battery would be deteriorated. Therefore, a most preferable range of the z is $0.1 \leq z \leq 1.0$.

The A in the general formula should preferably be at least one element selected from Co and Mn. Namely, the inclusion of these elements as A for a hydrogen-absorbing alloy to be incorporated into a negative electrode of secondary battery would lead to an improvement of the charge/discharge cycle property of the battery. In particular, when Co is included as A, the discharge capacity of the battery can be also enhanced.

When the content of Ni and A (y+z) in the hydrogen-absorbing alloy is confined to 2.5 or more, it is possible to prominently improve the hydrogen absorption/desorption property such as the hydrogen absorption/desorption rate of the alloy, and hence to enhance the discharge capacity and charge/discharge cycle property of the nickel-hydrogen secondary battery. However, if the y+z exceeds over 4.5, the hydrogen site of the alloy would be decreased, thus reducing the hydrogen absorption capacity of the alloy and hence deteriorating the discharge capacity of the secondary battery. Therefore, a more preferable range of the y+z is $3.0 \leq y+z \leq 3.8$.

The hydrogen-absorbing alloy should preferably be such that, when the alloy is analyzed by an X-ray diffraction method using CuK α-ray, the alloy exhibits a highest peak in the range of $42.1° \pm 1°$ and does not exhibit a peak having an intensity of more than 15% of the aforementioned highest peak in the range of $30.2° \pm 1°$. In other words, the hydrogen-absorbing alloy is analyzed by an X-ray diffraction method using CuK α-ray, a highest peak appears in the range of $42.1° \pm 1°$, and a peak does not appear in the range of $30.2° \pm 1°$, or even if a peak appears in the range of $30.2° \pm 1°$, the peak should be of not more than 15% in intensity of the aforementioned highest peak. It should be noted that the intensity of each peak is one obtained by subtracting the intensity of the background from the intensity of the peak actually measured.

If the hydrogen-absorbing alloy is constructed as mentioned above, the alloy contains as a principal phase a phase having an $AB_3$ type crystal structure such as $CeNi_3$ type crystal structure and $PuNi_3$ type crystal structure; an $A_2B_7$ type crystal structure such as $Ce_2Ni_7$ type crystal structure and $Gd_2Co_7$ type crystal structure; or a crystal structure which is similar to these types. In this case, the term "principal phase" noted above denotes a phase in the alloy which is highest in existing ratio.

If the hydrogen-absorbing alloy represented by the aforementioned general formula is such that, when the alloy is analyzed by an X-ray diffraction method using CuK α-ray, the alloy exhibits a highest peak in the range of $42.1° \pm 1°$ and a peak having an intensity of more than 15% of the aforementioned highest peak in the range of $30.2° \pm 1°$, the alloy contains as a principal phase a phase having a $CaCu_5$ type crystal structure such as $LaNi_5$ type crystal structure, or otherwise the alloy contains such a high ratio of the phase having the $CaCu_5$ type crystal structure that cannot be disregarded just like a principal phase.

If the hydrogen-absorbing alloy contains as a principal phase a phase having a $CaCu_5$ type crystal structure such as $LaNi_5$ type crystal structure, or contains the phase having the $CaCu_5$ type crystal structure at such a high ratio that cannot be disregarded just like a principal phase, it may be impossible to obtain a secondary battery having a sufficient charge/discharge capacity. A more preferable hydrogen-absorbing alloy among these preferable hydrogen-absorbing alloys is the one where a peak having an intensity of more than 10% of the aforementioned highest peak does not appear in the range of $30.2° \pm 1°$.

A most preferable alloy among the hydrogen-absorbing alloys represented by the aforementioned general formula (A) is such that, when the alloy is analyzed by an X-ray diffraction method using CuK α-ray, the alloy exhibits a highest peak in the range of $42.1° \pm 1°$ and a peak having an intensity greater than 5% of that of the highest peak in the range of $32.5° \pm 1°$ and does not exhibit a peak having an intensity greater than 15% of that of the highest peak in the range of $30.2° \pm 1°$. In particular, it is far more preferable to employ an alloy where a peak having an intensity of more than 10% of the aforementioned highest peak appears in the range of $32.5° \pm 1°$.

The hydrogen-absorbing alloy represented by the aforementioned general formula can be manufactured by means of a casting method, a sintering method, an ultra-quenching method such as a single rolling method, a double rolling method, a gas-atomizing method and a disk-atomizing method.

The alloy thus obtained is then preferably heat-treated in vacuum or in an inert atmosphere at a temperature ranging from 300° C. to less than melting point thereof for a time period ranging from 0.1 to 500 hours. It is possible through this heat treatment to alleviate the distortion in lattice of the alloy, so that the hydrogen absorption/desorption characteristics such as the hydrogen absorption/desorption rate of the alloy can be improved. The heat treatment temperature should preferably be in the range from 750 to 1,050° C., more preferably in the range from 800 to 1,000° C. Further, the heat treatment period should preferably be in the range from 0.5 to 100 hours, more preferably in the range from 1 to 20 hours.

This negative electrode can be manufactured by a process wherein the powder of a hydrogen-absorbing alloy represented by the aforementioned general formula is kneaded together with a high molecular weight binder and water to prepare a paste, which is then stuffed into a conductive substrate and, after being dried, molded into a predetermined shape.

As for the high molecular weight binder, the same kinds of material as employed for the positive electrode 2 can be employed.

A conductive material such as carbon black may be separately added to the aforementioned paste.

The conductive substrate may be formed of a two-dimensional substrate such as a punched metal, an expanded metal and a nickel net; or a three-dimensional substrate such as a felt-like metallic porous body or a sponge-like metallic substrate.

For the purpose of improving the high efficiency charge/discharge property of the negative electrode, conductive metallic pieces formed of a metal such as Ni may be added at a ratio of 0.3 to 20 parts by weight per 100 parts by weight of a hydrogen-absorbing alloy.

(3) The Separator 3

The separator 3 can be formed from a non-woven synthetic resin fabric, such as polypropylene fibers and nylon fibers; or a high molecular non-woven fabric such as a mixed non-woven fabric consisting of polypropylene fibers and nylon fibers. In particular, a non-woven fabric consisting of polyolefin fibers such as polypropylene fibers whose surface is treated to become hydrophilic is preferable.

(4) Alkaline Electrolyte

Examples of the alkaline electrolyte which are useful in this invention include an aqueous solution of sodium hydroxide (NaOH), an aqueous solution of potassium hydroxide (KOH), an aqueous solution of lithium hydroxide (LiOH), a mixed aqueous solution of NaOH and LiOH, a mixed aqueous solution of KOH and LiOH, and a mixed aqueous solution of NaOH, KOH and LiOH. The concentration of this alkaline electrolyte may be suitably selected, e.g. those having a concentration of 6N to 8N are generally employed.

The secondary battery according to this invention is constructed such that the relationship between the weight of the hydrogen-absorbing alloy per unit area of the negative electrode (M1(mg/cm$^2$)) and the weight per unit area of the separator (M2(g/m$^2$)) meets the following equation:

M1/M2≦6

If the ratio of M1/M2 exceeds over 6, i.e. if the weight of the hydrogen-absorbing alloy is more than six times higher than the weight per unit area of the separator as the absolute values of the weight of the hydrogen-absorbing alloy per unit area of the negative electrode and the weight per unit area of the separator are compared with each other under the condition of the aforementioned units, the self-discharge of the secondary battery may be easily occurred under the condition of high temperature storage. However, since it is impossible as a matter of fact to infinitely enlarge the weight per unit area of the separator in view of the capacity of the secondary battery, the lower limit of the M1/M2 should preferably be 0.5. More preferable range of the M1/M2 would be 1.0≦M1/M2≦5.0.

Although this invention has been explained about a cylindrical nickel-hydrogen secondary battery wherein the negative electrode and the positive electrode were spirally wound with the aforementioned separator being interposed therebetween and then placed in the bottomed cylindrical case 1 as shown in FIG. 1, this invention is not limited to such a configuration, but can be applied also to a prismatic nickel-hydrogen secondary battery, wherein a bottomed rectangular case is accommodated therein with a laminated body comprising positive electrodes and negative electrodes which are alternately superimposed one upon another with a separator being interposed therebetween.

As explained above, the nickel-hydrogen secondary battery according to the present invention comprises; a negative electrode containing a hydrogen-absorbing alloy; a positive electrode containing nickel hydroxide; and a separator comprising a non-woven fabric containing synthetic resin fibers. The hydrogen-absorbing alloy is represented by the following general formula: $(R_{1-x}Mg_x)Ni_yA_z$ (wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B); and x, y and z are atomic ratio individually defined as 0<x<1, 0≦z≦1.5, 2.5≦y+z<4.5). The secondary battery meets the condition represented by the following formula: M1/M2≦6 (wherein M1 is a weight of the hydrogen-absorbing alloy per unit area of the negative electrode (mg/cm$^2$); and M2 is a weight per unit area of the separator (g/m$^2$)).

According to this nickel-hydrogen secondary battery of this invention, it is now possible to enhance the battery capacity while inhibiting the self-discharge of the battery under a high temperature storage condition, etc.

Namely, since a negative electrode containing a hydrogen-absorbing alloy is caused to repeatedly expand and shrink due to the repetition of absorption and desorption of hydrogen, the hydrogen-absorbing alloy particles are gradually pulverized into smaller particles due to the strain generated by the repeated expansion and shrinkage of the alloy, finally reaching to a small particle size which cannot be pulverized by the strain generated by the repetition of absorption and desorption of hydrogen any more.

On the other hand, although the surface of hydrogen-absorbing alloy can be reacted more or less with an alkaline electrolyte, an electrochemically vulnerable component in the hydrogen-absorbing alloy is preferentially oxidized and at the same time, a metal such as nickel which is easily eroded in an alkaline solution is concentrated, thereby forming an oxide film on surface of hydrogen-absorbing alloy. The thickness of this oxide film increases as the temperature becomes higher. After the aforementioned pulverization is finished and hence the surface area of the hydrogen-absorbing alloy cannot increase any more, the amount of the eroded product of the negative electrode containing the hydrogen-absorbing alloy is determined by the ambient temperature to which the negative electrode is exposed. In the actual nickel-hydrogen battery, it is possible to realize a complete charging by performing an overcharging to some extent at the occasion of charging. Therefore, heat may be generated at the last stage of charging due to overcharging, and hence it is required to take into account an increase in temperature up to about 60° C. in the actual use of battery. Further, under the condition where the secondary battery is actually mounted on a portable machine, the interior of the battery pack is often heated up to about 60° C. due to the heat generated in the operation of the machine.

The eroded product in the negative electrode that has been produced due to the reaction of the alloy with the electrolyte is dissolved into the electrolyte in various degree depending on the fluctuation of temperature of the secondary battery. Thus, the eroded product gradually diffuses from the surface of the hydrogen-absorbing alloy into the separator made of a non-woven fabric of synthetic resin fibers and adheres onto the surface of the synthetic resin fibers. As a result, the insulation between the positive electrode and the negative electrode is deteriorated. Since this eroded product is not inherently provided with a high electronic conductivity, it does not raise any serious problem in the ordinary employment thereof. However, once the secondary battery is stored for a long period of time in the discharge state thereof, the positive electrode is excessively discharged due to the self-discharging, so that various problems such as an increase in polarization at the occasion of initially charging the battery after the storage thereof, or a decrease in charge/discharge capacity of the battery thereafter may be raised.

In view of overcoming these problems, this invention takes measures that the separator to be interposed between the negative electrode containing a hydrogen-absorbing alloy represented by the aforementioned general formula and the positive electrode disposed to face this negative electrode is varied depending on the quantity of the hydrogen-absorbing alloy included in the negative electrode to be separated by the separator. Namely, the weight of the hydrogen-absorbing alloy per unit area of the negative electrode (M1 (mg/cm$^2$)) is adjusted in relative to the weight per unit area of the separator (M2 (g/m$^2$)) so as to meet the relationship of M1/M2≦6. It has become possible by taking the aforementioned measures to provide a nickel-hydrogen secondary battery which is capable of preventing the overcharging (self-discharge) in a storage at a temperature range of actual use, and also capable of realizing a high capacity.

In particular, when the hydrogen-absorbing alloy exhibits a highest peak in the range of 42.1°±1° and does not exhibit a peak having an intensity greater than 15% of that of the highest peak in the range of 30.2°±1° as measured by X-ray diffraction using CuK α-ray, it is possible not only to enhance the capacity of the secondary battery without damaging other desired properties, but also to improve the charge/discharge cycle life of the secondary battery. Further, when the hydrogen-absorbing alloy further exhibits a peak having an intensity of more than 5% of the highest peak in the range of 32.5°±1°, it is possible to further improve the charge/discharge cycle life of the secondary battery.

Next, preferable examples of this invention will be explained in detail as follows.

EXAMPLES 1-1 to 1-6

By melting the elements of La, Mg, Ni and Co by making use of a high frequency induction melting furnace, a hydrogen-absorbing alloy having a composition of $(La_{0.7}Mg_{0.3})Ni_{2.5}Co_{0.5}$ was obtained. The alloy thus obtained was then homogenized in an argon atmosphere by heat-treating it at a temperature of 900° C. This hydrogen-absorbing alloy was then subjected to an X-ray diffraction analysis using CuK α-ray to obtain a diffraction chart a shown in FIG. 2.

Figure 2:
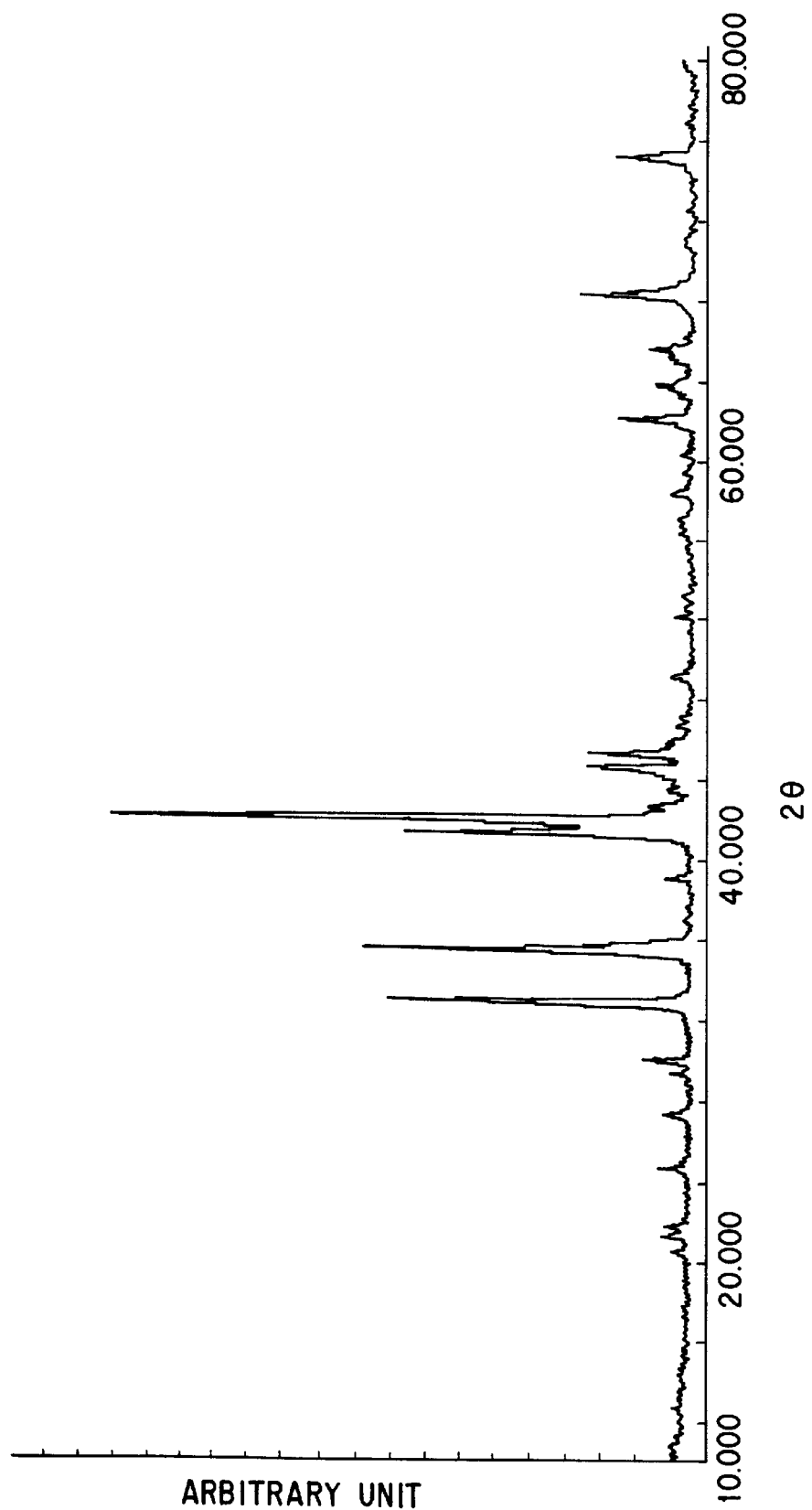
FIG. 2 is a chart as obtained in an X-ray diffraction analysis using CuK α-ray on the hydrogen-absorbing alloy contained in the negative electrode of the nickel-hydrogen secondary battery according to Example 1.

As seen from FIG. 2, the hydrogen-absorbing alloy thus obtained indicated a highest peak in the range of 42.1°±1°, a peak having an intensity of 8.8% of the aforementioned highest peak in the range of 30.2°±1° and a peak having an intensity of 56% of the aforementioned highest peak in the range of 32.5°±1°. It should be noted that the intensity of each peak is one obtained by subtracting the intensity of the background from the intensity of the peak actually measured.

This hydrogen-absorbing alloy was then pulverized in an inert atmosphere, and subsequently sieved to select alloy powder having particle sizes ranging from 400 mesh to 200 mesh. Then, 100 parts by weight of the hydrogen-absorbing alloy powder was mixed with 0.5 part by weight of nickel powder which was prepared by means of carbonyl process and available in the market thereby to obtain a mixture. Thereafter, 100 parts by weight of this mixture were mixed with 0.4 part by weight of sodium polyacrylate, 0.1 part by weight of carboxymethyl cellulose and 2.5 parts by weight of polytetrafluoroethylene dispersion (dispersion medium: water, solid matters: 60% by weight) to obtain a mixture, which was then kneaded to obtain a paste. The paste was then coated on both surfaces of a substrate having a thickness of 60 μm and formed of a porous nickel-plated iron sheet, the resultant couple of coated layers being differed in thickness from each other. The resultant substrate was then dried and press-molded, thus obtaining a plurality of coated sheets, each having a weight of the hydrogen-absorbing alloy per unit area of the negative electrode of 100 mg/cm$^2$, 150 mg/cm$^2$, 200 mg/cm$^2$, 250 mg/cm$^2$ and 300 mg/cm$^2$. Then, 2 cm square sheet (effective area) was cut out of each of these coated sheets, and thereafter a lead wire was attached to an edge portion of the 2 cm square sheet thereby manufacturing a negative electrode sheet.

As a separator, non-woven fabrics formed of polyolefin fiber having an average size (diameter) of about 2 μm as measured from the SEM image thereof and hydrophilized through a graft polymerization treatment of acrylic acid, the weight per unit area of the non-woven fabrics being 15 g/m$^2$, 20 g/m$^2$, 30 g/m$^2$, 40 g/m$^2$, 50 g/m$^2$ and 60 g/m$^2$ respectively were prepared.

Then, the separator was superimposed on both surfaces of each of the negative electrode sheets to form a laminate body, which was further sandwiched by a pair of conventional sintered type nickel positive sheets each having an effective area of 2 cm square (2 cm×2 cm) and a larger capacity (per unit area) than that of the negative electrode sheet (the capacity at one side of the positive electrode sheet: 100 mAh/cm$^2$×4 cm$^2$=400 mAh), thereby to form an electrode group. After the electrode group was superimposed thereon with an acrylic resin plate as an insulating plate, and with a stainless plate as an enforcing plate, a pressure was uniformly applied to the electrode group from the outside of the stainless plate so as to apply a pressing force of 5 kg/cm$^2$ to the electrode group. Subsequently, the electrode group was immersed into a KOH electrolyte of 8N thereby assembling a negative electrode capacity controlling cell.

Each cell thus obtained was subjected to 10 cycles of charge/discharge at room temperature, each cycle being consisted of a charging with a current density of 40 mA/g for 900 minutes depending on the weight of the hydrogen-absorbing alloy in the negative electrode and a discharging with the same current density as mentioned above until the voltage was lowered down to 0.9V. Subsequently, a temperature fluctuation of between 60° C. and room temperature that may be expected in the actual use of battery was simulated. Namely, the cell was subjected to 100 cycles of charge/discharge under a temperature cycle wherein the cell was kept at a temperature of 60° C. for 5 hours, cooled down to 20° C. taking 30 minutes, kept at a temperature of 20° C. for 5 hours, and heated up to 60° C. taking 30 minutes, each cycle being consisted of a charging with a current density of 400 mA/g for 90 minutes, and, after 10 minutes of cut-off, discharged with a current density of 400 mA/g until the voltage between the terminals was lowered down to 0.9V. The 101st cycle was performed at a temperature of 20° C. under the same charge/discharge conditions as mentioned above thereby to measure the discharge capacity of each cell. Furthermore, after the cell was charged with a current density of 400 mA/g for 90 minutes at a temperature of 20° C., the cell was stored in an environment of 45° C.

After 30 days of storage, the cell was taken out and discharged with a current density of 400 mA/g at a temperature of 20° C. thereby to measure a residual capacity of the cell, and the residual ratio of capacity was calculated based on the discharge capacity of the cell at the 101st cycle, the results being shown in the following Table 1.

EXAMPLES 2-1 to 2-6

By melting the elements of La, Nd, Mg, Ni and Mn by making use of a high frequency induction melting furnace, a hydrogen-absorbing alloy having a composition of $(La_{0.5}Nd_{0.2}Mg_{0.3})Ni_{2.8}Mn_{0.2}$ was obtained. The alloy thus obtained was then homogenized in an argon atmosphere by heat-treating it at a temperature of 900° C. Then, a cell was assembled in the same manner as illustrated in the aforementioned Examples 1-1 to 1-6 except that the alloy thus obtained was employed and that a 6N alkaline electrolyte containing 5N KOH, 0.5N NaOH and 0.5N LiOH was employed as an electrolyte.

The hydrogen-absorbing alloy thus obtained indicated a highest peak in the range of 42.1°±1°, a peak having an intensity of 6.2% of the aforementioned highest peak in the range of 30.2°±1° and a peak having an intensity of 46% of the aforementioned highest peak in the range of 32.5°±1°. It should be noted that the intensity of each peak is one obtained by subtracting the intensity of the background from the intensity of the peak actually measured.

The magnitude of self-discharge of each cell was then measured, the results being shown in the following Table 2.

EXAMPLES 3-1 to 3-6

By melting the elements of La, Pr, Mg, Ni and Al by making use of a high frequency induction melting furnace, a hydrogen-absorbing alloy having a composition of $(La_{0.5}Pr_{0.3}Mg_{0.2})Ni_{2.8}Al_{0.2}$ was obtained. The alloy thus obtained was then homogenized in an argon atmosphere by heat-treating it at a temperature of 900° C. Then, a cell was assembled in the same manner as illustrated in the aforementioned Examples 1-1 to 1-6 except that the alloy thus obtained was employed.

The hydrogen-absorbing alloy thus obtained indicated a highest peak in the range of 42.1°±1°, a peak having an intensity of 9.5% of the aforementioned highest peak in the range of 30.2°±1° and a peak having an intensity of 44% of the aforementioned highest peak in the range of 32.5°±1°. It should be noted that the intensity of each peak is one obtained by subtracting the intensity of the background from the intensity of the peak actually measured.

The magnitude of self-discharge of each cell was then measured, the results being shown in the following Table 3.

EXAMPLES 4-1 to 4-6

A hydrogen-absorbing alloy having the same composition and the same particle size as those of Example 1 was employed. Then, 100 parts by weight of the hydrogen-absorbing alloy powder was mixed with 25 parts by weight of a 4 wt. % aqueous solution of polyvinyl alcohol thereby to obtain a mixture, which was then kneaded to obtain a paste. The paste was then charged into a foamed nickel substrate, thus obtaining negative electrode sheets, each having a weight of per unit area of the negative electrode of 70 mg/cm$^2$, 150 mg/cm$^2$ and 250 mg/cm$^2$.

Then, a cell was assembled using the negative electrode sheet thus obtained in combination with a separator and a positive electrode sheet of the same kinds as employed in the aforementioned Examples 1-1 to 1-6. The magnitude of self-discharge of each cell was then measured, the results being shown in the following Table 4.

EXAMPLES 5-1 to 5-6

A cell was assembled in the same manner as illustrated in the aforementioned Examples 1-1 to 1-6 except that non-woven fabrics formed of polyolefin fiber having an average size (diameter) of about 8 μm as measured from the SEM image thereof and hydrophilized through a graft polymerization treatment of acrylic acid, the weight per unit area of the non-woven fabrics being 15 g/m$^2$, 20 g/m$^2$, 30 g/m$^2$, 40 g/m$^2$, 50 g/m$^2$ and 60 g/m$^2$ respectively, were employed.

The magnitude of self-discharge of each cell was then measured, the results being shown in the following Table 5.

EXAMPLES 6-1 to 6-6

A cell was assembled in the same manner as illustrated in the aforementioned Examples 1-1 to 1-6 except that non-woven fabrics formed of polyolefin fiber having an average size (diameter) of about 2 μm as measured from the SEM image thereof and hydrophilized through a sulfonation treatment, the weight per unit area of the non-woven fabrics being 15 g/m$^2$, 20 g/m$^2$, 30 g/m$^2$, 40 g/m$^2$, 50 g/m$^2$ and 60 g/m$^2$ respectively, were employed.

The magnitude of self-discharge of each cell was then measured, the results being shown in the following Table 6.

EXAMPLES 7-1 to 7-6

A cell was assembled in the same manner as illustrated in the aforementioned Examples 1-1 to 1-6 except that hydrogen-absorbing alloy particles which were passed through a 400 mesh sieve were employed. The magnitude of self-discharge of each cell was then measured, the results being shown in the following Table 7.

The following Tables 1 to 7 also show the values of M1/M2 where M1 is a weight of the hydrogen-absorbing alloy per unit area of the negative electrode (mg/cm$^2$), and M2 is a weight per unit area of the separator (g/m$^2$).

TABLE 1

(Values in the box denote residual ration of capacity (%); and values in the parenthesis denote M1/M2)

| Examples | Weight per unit area of separator M2 (g/m$^2$) | Weight per unit area of alloy M1 (mg/cm$^2$) | | | | |
|---|---|---|---|---|---|---|
| | | 100 | 150 | 200 | 250 | 300 |
| 1-1 | 15 | 22(6.7) | 19(10) | 18(13) | 16(16.7) | 12(20) |
| 1-2 | 20 | 62(5.0) | 28(7.5) | 24(10) | 19(12.5) | 14(15) |
| 1-3 | 30 | 63(3.3) | 61(5.0) | 33(6.7) | 25(8.3) | 19(10) |
| 1-4 | 40 | 65(2.5) | 63(3.7) | 62(5.0) | 38(6.2) | 22(7.5) |
| 1-5 | 50 | 67(2.0) | 63(3.0) | 63(4.0) | 61(5.0) | 54(6.0) |
| 1-6 | 60 | 69(1.7) | 65(2.5) | 65(3.3) | 63(4.1) | 62(5.0) |

TABLE 2

(Values in the box denote residual ration of capacity (%); and values in the parenthesis denote M1/M2)

| Examples | Weight per unit area of separator M2 (g/m$^2$) | Weight per unit area of alloy M1 (mg/cm$^2$) | | | | |
|---|---|---|---|---|---|---|
| | | 100 | 150 | 200 | 250 | 300 |
| 2-1 | 15 | 24(6.7) | 21(10) | 18(13) | 15(16.7) | 12(20) |
| 2-2 | 20 | 61(5.0) | 27(7.5) | 24(10) | 17(12.5) | 15(15) |
| 2-3 | 30 | 63(3.3) | 60(5.0) | 30(6.7) | 23(8.3) | 17(10) |
| 2-4 | 40 | 64(2.5) | 63(3.7) | 61(5.0) | 30(6.2) | 23(7.5) |
| 2-5 | 50 | 65(2.0) | 63(3.0) | 63(4.0) | 60(5.0) | 53(6.0) |
| 2-6 | 60 | 66(1.7) | 64(2.5) | 63(3.3) | 63(4.1) | 62(5.0) |

TABLE 3

(Values in the box denote residual ration of capacity (%); and values in the parenthesis denote M1/M2)

| Examples | Weight per unit area of separator M2 (g/m$^2$) | Weight per unit area of alloy M1 (mg/cm$^2$) | | | | |
|---|---|---|---|---|---|---|
| | | 100 | 150 | 200 | 250 | 300 |
| 3-1 | 15 | 20(6.7) | 17(10) | 16(13) | 15(16.7) | 12(20) |
| 3-2 | 20 | 57(5.0) | 24(7.5) | 22(10) | 18(12.5) | 14(15) |
| 3-3 | 30 | 57(3.3) | 56(5.0) | 29(6.7) | 23(8.3) | 17(10) |
| 3-4 | 40 | 59(2.5) | 57(3.7) | 55(5.0) | 30(6.2) | 21(7.5) |
| 3-5 | 50 | 60(2.0) | 59(3.0) | 57(4.0) | 56(5.0) | 50(6.0) |
| 3-6 | 60 | 62(1.7) | 60(2.5) | 58(3.3) | 57(4.1) | 56(5.0) |

TABLE 4

(Values in the box denote residual ration of capacity (%); and values in the parenthesis denote M1/M2)

| Examples | Weight per unit area of separator M2 (g/m$^2$) | Weight per unit area of alloy M1 (mg/cm$^2$) | | |
|---|---|---|---|---|
| | | 70 | 150 | 250 |
| 4-1 | 15 | 58(4.7) | 22(10) | 20(16.7) |
| 4-2 | 20 | 60(3.5) | 30(7.5) | 25(12.5) |

TABLE 4-continued (Values in the box denote residual ration of capacity (%); and values in the parenthesis denote M1/M2)

| Examples | Weight per unit area of separator M2 (g/m²) | Weight per unit area of alloy M1 (mg/cm²) | | |
|---|---|---|---|---|
| | | 70 | 150 | 250 |
| 4-3 | 30 | 61(2.3) | 59(5.0) | 28(8.3) |
| 4-4 | 40 | 62(1.75) | 60(3.7) | 32(6.2) |
| 4-5 | 50 | 62(1.4) | 62(3.0) | 59(5.0) |
| 4-6 | 60 | 64(1.2) | 63(2.5) | 61(4.1) |

TABLE 5

(Values in the box denote residual ration of capacity (%); and values in the parenthesis denote M1/M2)

| Examples | Weight per unit area of separator M2 (g/m²) | Weight per unit area of alloy M1 (mg/cm²) | | | | |
|---|---|---|---|---|---|---|
| | | 100 | 150 | 200 | 250 | 300 |
| 5-1 | 15 | 19(6.7) | 17(10) | 17(13) | 14(16.7) | 12(20) |
| 5-2 | 20 | 56(5.0) | 23(7.5) | 21(10) | 16(12.5) | 14(15) |
| 5-3 | 30 | 58(3.3) | 56(5.0) | 29(6.7) | 20(8.3) | 16(10) |
| 5-4 | 40 | 58(2.5) | 59(3.7) | 57(5.0) | 31(6.2) | 19(7.5) |
| 5-5 | 50 | 60(2.0) | 60(3.0) | 59(4.0) | 58(5.0) | 51(6.0) |
| 5-6 | 60 | 62(1.7) | 62(2.5) | 61(3.3) | 60(4.1) | 58(5.0) |

TABLE 6

(Values in the box denote residual ration of capacity (%); and values in the parenthesis denote M1/M2)

| Examples | Weight per unit area of separator M2 (g/m²) | Weight per unit area of alloy M1 (mg/cm²) | | | | |
|---|---|---|---|---|---|---|
| | | 100 | 150 | 200 | 250 | 300 |
| 6-1 | 15 | 23(6.7) | 20(10) | 18(13) | 17(16.7) | 14(20) |
| 6-2 | 20 | 66(5.0) | 27(7.5) | 23(10) | 20(12.5) | 16(15) |
| 6-3 | 30 | 67(3.3) | 64(5.0) | 32(6.7) | 23(8.3) | 19(10) |
| 6-4 | 40 | 69(2.5) | 66(3.7) | 65(5.0) | 36(6.2) | 21(7.5) |
| 6-5 | 50 | 70(2.0) | 66(3.0) | 65(4.0) | 65(5.0) | 58(6.0) |
| 6-6 | 60 | 72(1.7) | 70(2.5) | 69(3.3) | 66(4.1) | 65(5.0) |

TABLE 7

(Values in the box denote residual ration of capacity (%); and values in the parenthesis denote M1/M2)

| Examples | Weight per unit area of separator M2 (g/m²) | Weight per unit area of alloy M1 (mg/cm²) | | | | |
|---|---|---|---|---|---|---|
| | | 100 | 150 | 200 | 250 | 300 |
| 7-1 | 15 | 20(6.7) | 17(10) | 17(13) | 15(16.7) | 10(20) |
| 7-2 | 20 | 55(5.0) | 22(7.5) | 20(10) | 17(12.5) | 12(15) |
| 7-3 | 30 | 57(3.3) | 56(5.0) | 27(6.7) | 19(8.3) | 16(10) |
| 7-4 | 40 | 59(2.5) | 58(3.7) | 57(5.0) | 27(6.2) | 19(7.5) |
| 7-5 | 50 | 60(2.0) | 60(3.0) | 59(4.0) | 56(5.0) | 50(6.0) |
| 7-6 | 60 | 61(1.7) | 61(2.5) | 60(3.3) | 58(4.1) | 56(5.0) |

As seen from Tables 1 to 7, the cells according to this invention having a structure where a negative electrode containing a hydrogen-absorbing alloy represented by the aforementioned general formula is sandwiched via a separator by a pair of positive electrodes, and where the ratio between the weight of the hydrogen-absorbing alloy per unit area of the negative electrode (M1 (mg/cm²)) and the weight per unit area of the separator (M2 (g/m²)) is adjusted to 6 or less (M1/M2≦6), the residual ratio of capacity of the cells was all found higher than that of the cells where this ratio exceeded over 6.

Further, it was also found possible to inhibit the self-discharge of the cell, even if the hydrogen-absorbing alloy to be employed as a negative electrode of the cell of this invention and represented by the aforementioned composition is varied in composition, in initial particle diameter, in thickness of fiber of the separator, or in the method of hydrophilization treatment of the separator.

EXAMPLE 8

By making use of a high frequency induction melting furnace, a hydrogen-absorbing alloy represented by a composition of $Mm_{1.0}Ni_{4.0}Co_{0.4}Mn_{0.3}Al_{0.3}$ (Mm is a lanthanum-rich misch metal) was obtained. The alloy thus obtained was then homogenized in an argon atmosphere by heat-treating it at a temperature of 1000° C. Then, a cell was assembled in the same manner as illustrated in the aforementioned Examples 1-1 to 1-6 (the weight of the hydrogen-absorbing alloy per unit area of the negative electrode being 100 mg/cm²) except that the alloy thus obtained was employed.

This hydrogen-absorbing alloy was then subjected to an X-ray diffraction analysis using CuK α-ray to find that the hydrogen-absorbing alloy thus obtained indicated a highest peak in the range of 42.1°±1°, a peak having an intensity of 52% of the aforementioned highest peak in the range of 30.2°±1°. However, a peak having an intensity of more than 5% of the aforementioned highest peak was not recognized in the range of 32.5°±1°. It should be noted that the intensity of each peak is one obtained by subtracting the intensity of the background from the intensity of the peak actually measured. As a result, this hydrogen-absorbing alloy was admitted as containing a phase having a $LaNi_5$ type crystal structure as a principle phase.

Each of the cells obtained from Examples 1-6 (M1/M6= 1.7), 2-6 (M1/M6=1.7), 3-6 (M1/M6=1.7) which have a weight of the hydrogen-absorbing alloy per unit area of the negative electrode being 100 mg/cm², respectively, and Example 8 was subjected charge/discharge cycles at a temperature of 20° C., each cycle being consisted of a charging with a current density of 400 mAh/g for 72 minutes, and after a 30 minute cut-off, discharging with a current density of 400 mAh/g until the battery voltage was decreased down to 1.0V, thereby to measure the discharge capacity of 10th cycle per the weight of alloy. The results are shown in the following Table 8.

TABLE 8

| | discharge capacity per the weight of alloy (mAh/g) |
|---|---|
| Example 1-6 (M1/M2 = 1.7) | 395 |
| Example 2-6 (M1/M2 = 1.7) | 392 |
| Example 306 (M1/M2 = 1.7) | 386 |
| Example 8 | 302 |

As apparent from Table 8, the cells obtained from Examples 1-6 (M1/M6=1.7), 2-6 (M1/M6=1.7), 3-6 (M1/M6=1.7) were found larger in the discharge capacity as compared with the cell of Example 8.

As explained above, it is possible according to the present invention, to provide a nickel-hydrogen secondary battery, where a hydrogen-absorbing alloy containing magnesium, a rare earth element and nickel as essential elements is employed for the negative electrode, which is capable of preventing the self-discharge-inhibiting property from being deteriorated due to an increase in temperature in a high temperature storage or in a last stage of charging even after the battery has undergone a large number of charge/discharge cycles.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nickel-hydrogen secondary battery comprising;
   a negative electrode containing a hydrogen-absorbing alloy;
   a positive electrode containing nickel hydroxide;
   a separator comprising a non-woven fabric containing synthetic resin fibers; and
   an alkaline electrolyte;
   wherein said hydrogen-absorbing alloy is represented by the following general formula:

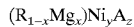
   $(R_{1-x}Mg_x)Ni_yA_z$ wherein R is at least one element selected from rare earth elements (including yttrium), Ca, Zr and Ti; A is at least one element selected from Co, Mn, Fe, V, Cr, Nb, Al, Ga, Zn, Sn, Cu, Si, P and B); and x, y and z are atomic ratio individually defined as $0<x<1$, $0\leq z\leq 1.5$, $2.5\leq y+z<4.5$; and said secondary battery meets the condition represented by the following formula:

$M1((mg/cm^2)/M2(g/m^2)\leq 6$ wherein M1 is a weight of said hydrogen-absorbing alloy per unit area of said negative electrode $(mg/cm^2)$; and M2 is a weight per unit area of said separator $(g/m^2)$.

2. The secondary battery according to claim 1, wherein R is at least one element selected from the group consisting of La, Ce, Pr, Nd and Y.

3. The secondary battery according to claim 1, wherein A is at least one element selected from the group consisting of Co and Mn.

4. The secondary battery according to claim 1, wherein said x in said general formula is $0.1\leq x\leq 0.6$.

5. The secondary battery according to claim 1, wherein said z in said general formula is $0.1\leq z\leq 1.0$.

6. The secondary battery according to claim 1, wherein said y+z in said general formula is $3.0\leq y+z\leq 3.8$.

7. The secondary battery according to claim 1, wherein when said hydrogen-absorbing allay is analyzed by an X-ray diffraction method using CuK α-ray, the alloy exhibits a highest peak in the range of $42.1°\pm 1°$, and does not exhibit a peak having an intensity greater than 15% of that of said highest peak in the range of $30.2°\pm 1°$.

8. The secondary battery according to claim 7, wherein said hydrogen-absorbing alloy further exhibits a peak having an intensity greater than 5% of that of said highest peak in the range of $32.5°\pm 1°$.

9. The secondary battery according to claim 1, wherein said M1/M2 is in the range of $0.5\leq M1/M2\leq 6$.

10. The secondary battery according to claim 1, wherein said M1/M2 is in the range of $1.0\leq M1/M2\leq 5.0$.

11. The secondary batttery according to claim 1, wherein said alkaline electrolyte has a concentration of 6N to 8N.

* * * * *